No. 806,089. PATENTED NOV. 28, 1905.
J. C. WANDS.
DEVICE FOR RELIEVING PRESSURE ON MOTOR VEHICLE TIRES.
APPLICATION FILED MAY 27, 1905.

3 SHEETS—SHEET 1.

Witnesses
A. J. McCauley
B. F. Funk

Inventor:
John C. Wands
BY Bakewell Cornwall
ATTYS.

No. 806,089. PATENTED NOV. 28, 1905.
J. C. WANDS.
DEVICE FOR RELIEVING PRESSURE ON MOTOR VEHICLE TIRES.
APPLICATION FILED MAY 27, 1905.
3 SHEETS—SHEET 2.
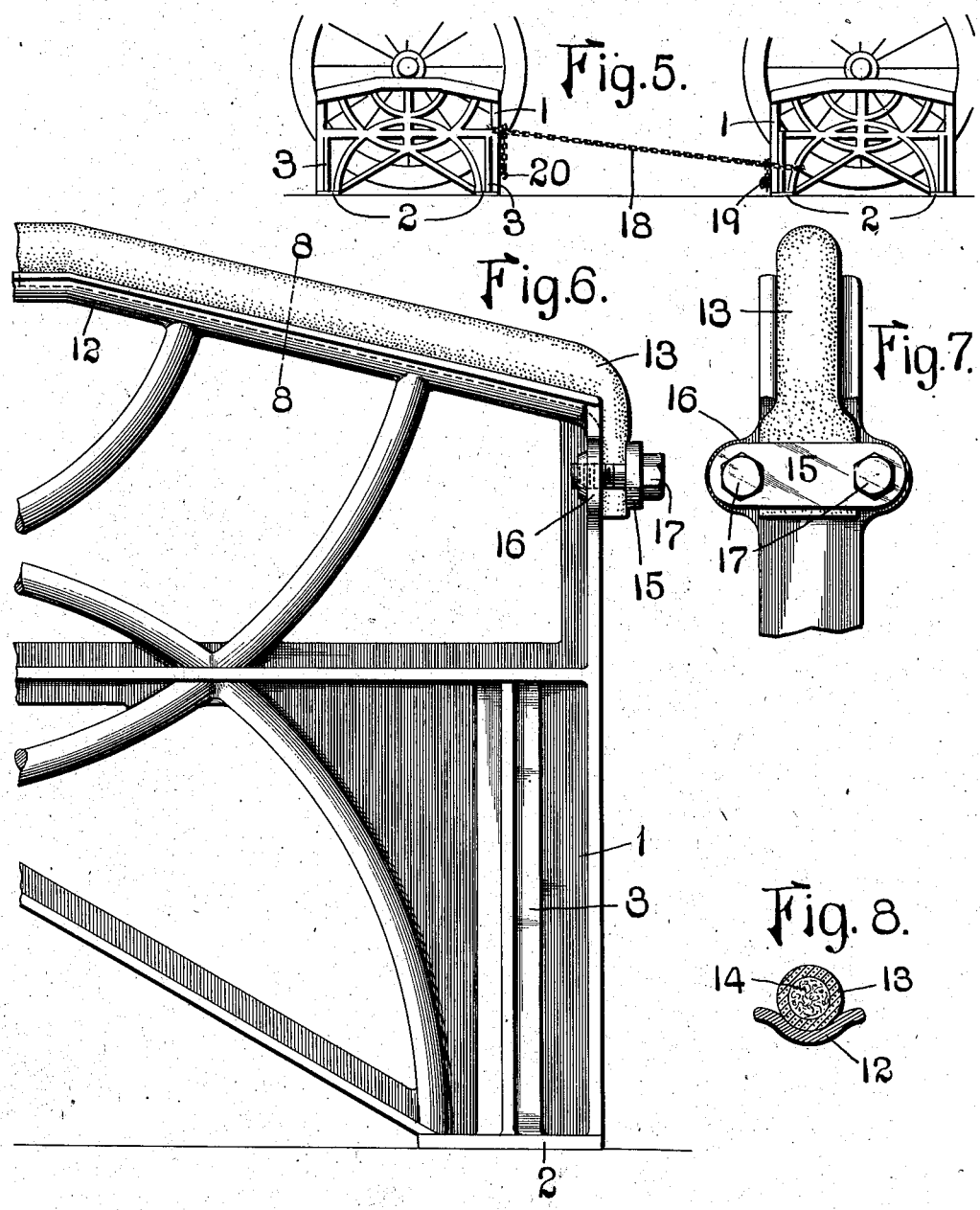
Witnesses
A. J. McCauley
B. F. Funk
Inventor:
John C. Wands
BY Bakewell Cornwall
ATT'Y'S.

No. 806,089. PATENTED NOV. 28, 1905.
J. C. WANDS.
DEVICE FOR RELIEVING PRESSURE ON MOTOR VEHICLE TIRES.
APPLICATION FILED MAY 27, 1905.
3 SHEETS—SHEET 3.
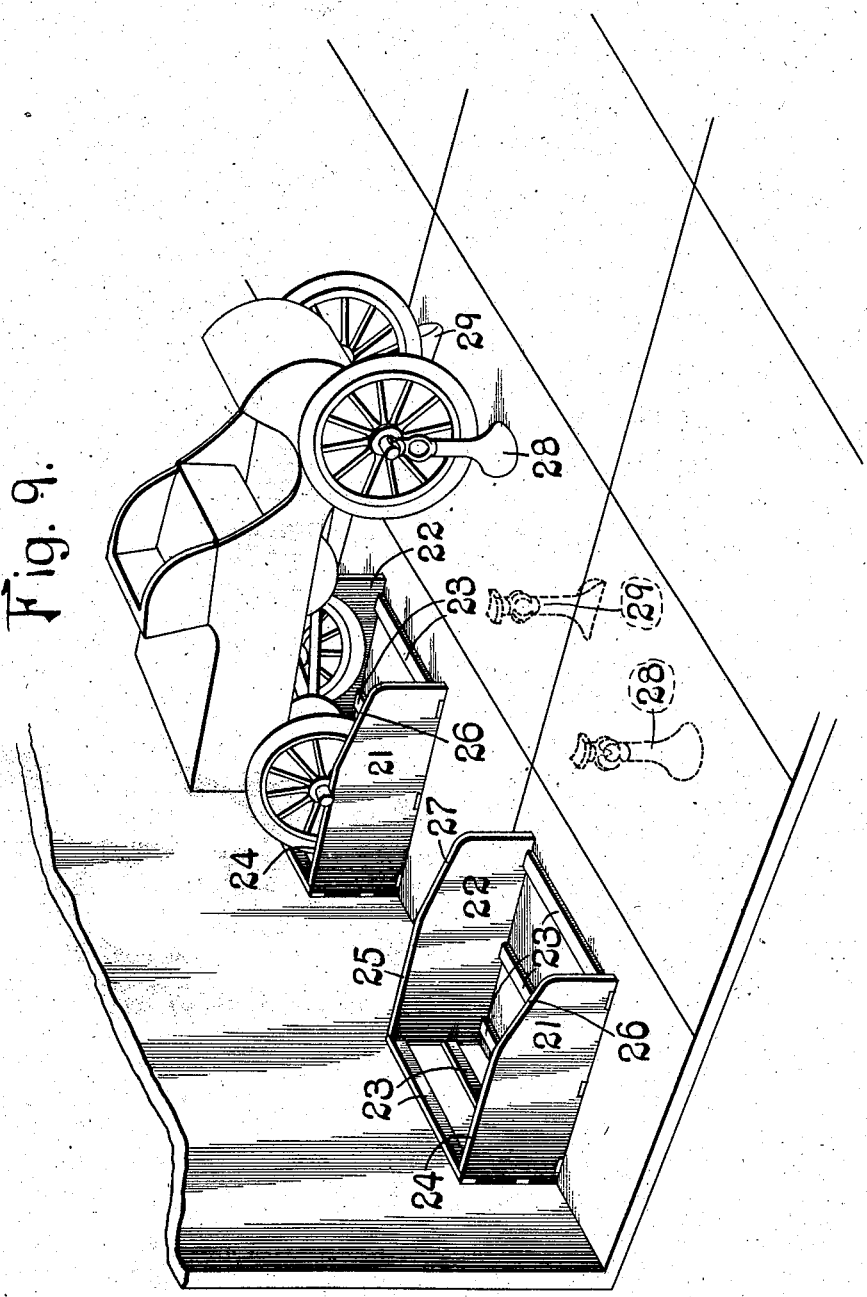
Witnesses
A. J. McCauley.
B. F. Funk.
Inventor:
John C. Wands
BY Bakewell & Cornwall
ATT'Y'S.

UNITED STATES PATENT OFFICE.

JOHN C. WANDS, OF ST. LOUIS, MISSOURI.

DEVICE FOR RELIEVING PRESSURE ON MOTOR-VEHICLE TIRES.

No. 806,089.     Specification of Letters Patent.     Patented Nov. 28, 1905.

Application filed May 27, 1905. Serial No. 262,610.

*To all whom it may concern:*

Be it known that I, JOHN C. WANDS, a citizen of the United States, residing at the city of St. Louis, State of Missouri, have invented a certain new and useful Improvement in Devices for Relieving Pressure on Motor-Vehicle Tires, of which the following is a full, clear, and exact description, such as will enable others skilled in the art to which it appertains to make and use the same, reference being had to the accompanying drawings, forming a part of this specification, in which—

Figure 1:
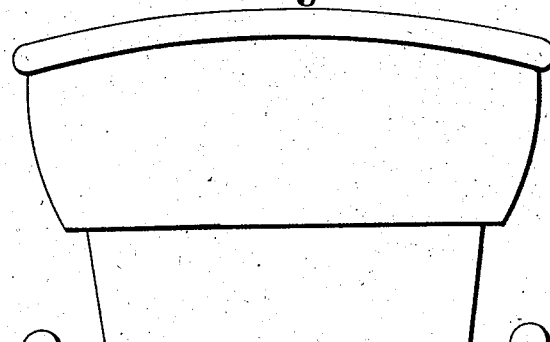
Figure 3:
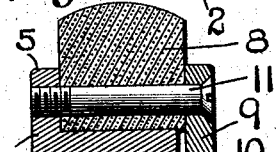
Figure 2:
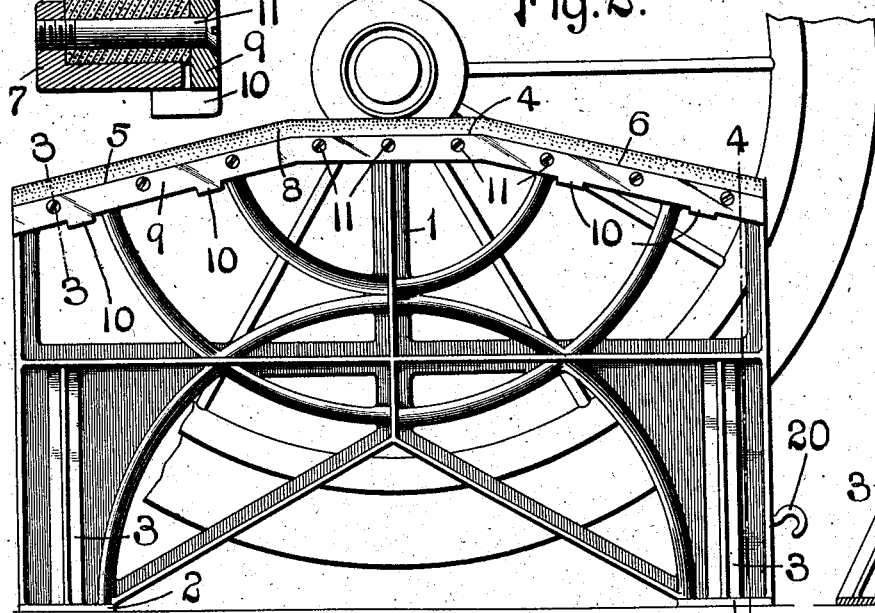
Figure 4:
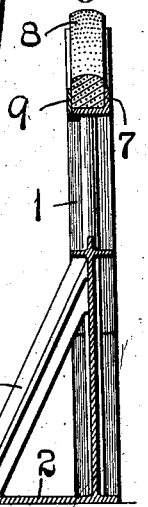

Figure 1 is a rear elevational view of a motor-vehicle the wheels of which are elevated by devices constructed in accordance with my invention. Fig. 2 is a side elevational view of one of the tire-relieving devices. Fig. 3 is a cross-sectional view on the line 3 3 of Fig. 2. Fig. 4 is a cross-sectional view on the line 4 4 of Fig. 2. Fig. 5 is a side elevational view of two of the devices connected together. Fig. 6 is a fragmentary elevational view of a modified form of tire-relieving device. Fig. 7 is an end view of the yielding bed-clamp. Fig. 8 is a cross-sectional view on the line 8 8 of Fig. 6, and Fig. 9 is a perspective view of the interior of the premises for the temporary storage of motor-vehicles in which is arranged a modified form of my invention.

This invention relates to a tire-relieving device—that is to say, of a device for relieving pressure on the tires of motor-vehicles when the vehicle is not being used. As is well known, motor-vehicles are generally equipped with pneumatic tires and the wear and deterioration of the tires due to the dead-weight of the vehicle-body, the driving-gear, &c., tends to materially shorten the life of the tires.

It is the purpose of my invention to provide means whereby the pressure due to the weight of the vehicle-body may be relieved when the vehicle is not being used, and thus prolong the life of the tires.

In the drawings I have illustrated one form of my device, in which 1 designates a vertical frame in the form of a truss and having a base-flange 2.

3 designates inclined braces which are connected to the trussed frame and the base-flanges 2. The frame is preferably constructed of a malleable casting so that it may be light, durable, and ornamental. However, I reserve the right to construct the frame of any other material, if desired. The top of the frame is provided with a horizontal intermediate portion 4 and inclined end portions 5 and 6. These portions 4, 5, and 6, are provided with an upstanding flange 7, projecting from the base of the top which receives a resilient bed 8. This bed is shown as being approximately rectangular in cross-section and is held upon the upper portion of the frame by means of a strip 9 parallel with the upstanding flange 7, which strip is provided with guide-lugs 10, resting beneath the base of the bed, the strip 9 and the upstanding flange comprising jaws for engaging the bed 8, which jaws are held in clamped position by means of clamp devices illustrated as bolts 11.

In Fig. 6 the base for the bed is of concavo-convex form, as designated by the reference-numeral 12, and this base receives a resilent-bed, such as a hose or tube 13, which may be stuffed with any material—such, for example, as cotton-waste, as indicated by the reference-numeral 14. The ends of the hose or tube may be secured by means of the clamp-bar 15, which acts as a movable jaw coöperating with a rigid jaw 16 at the end of the frame, said jaws being secured together by means of the adjusting devices 17.

In general practice four of these devices will be utilized, and in order to prevent the disarrangement thereof the respective rear and front devices, which aline with each other, will be secured together by a flexible connection—as, for example, a chain 18, which may pass around the end of each frame and be secured to the respective hooks 19 and 20.

From the foregoing description it will be apparent that the pressure-relieving devices are in the form of skids or arches. When it is desired to raise the wheels so as to relieve the pressure upon the tires, the relieving devices are placed adjacent to the respective wheels and the engine or motor of the car is started, so that the hubs will roll up the inclined portions of the respective skids until they are adjacent to the horizontal portions of the bed. As these horizontal portions are of sufficient heights to raise the tire off the ground, the pressure will be relieved and the inside pressure of the tire may be relieved during the time that the vehicle is not being used. By connecting up the alining skids any tendency of accidental displacement of the skids with respect to each other will be avoided and the adjustments for the vehicles having different wheel-bases are provided for by shortening or lengthening the chain 18.

I have illustrated and described the bed as being of a resilient material, preferably rubber, but I may also utilize any other suitable material, such as soft pine, but the general arrangement of the parts will in each case be the same.

In the modified form (illustrated in Fig. 9) I have shown the devices arranged in the form of stalls for the reception of the motor-vehicles. These stalls may or may not be permanently attached to the floor or wall of the premises in which they are located. The supports consist of parallel vertical walls 21 and 22, connected by cross-bars 23. The vertical walls 21 and 22 carry resilient beds having horizontal portions 24 and 25, respectively, and inclined portions 26 and 27, up which the rear wheels of the vehicle may roll onto the horizontal portions 24 and 25. These horizontal portions 24 and 25 will be a sufficient distance above the floor to accommodate wheels of the largest diameter, so that they will be adapted to support any-sized wheel now generally used on motor-vehicles.

The front wheels may be jacked up by suitable jacks—as, for example, those designated by the reference-numerals 28 and 29—and any number of these supports may be arranged within the premises, depending upon the space utilized for the purpose of storing the vehicles.

Having thus described the invention, what is claimed as new, and desired to be secured by Letters Patent, is—

1. A device of the class described comprising a base having a horizontal hub-receiving portion and an inclined portion for guiding the wheel-hub onto the horizontal portion; substantially as described.

2. A device of the class described comprising a base having a hub-receiving bed provided with an intermediate horizontal portion and oppositely-inclined guide portions; substantially as described.

3. A device of the class described comprising a base having a rigid bed-receiving jaw and a movable jaw coöperating with the rigid jaw; substantially as described.

4. A device of the class described comprising a base provided with transversely-inclined braces, the upper portion of said base having an intermediate horizontal portion and oppositely-inclined end portions, and a yielding bed supported by said horizontal and inclined portions and conforming to the configuration thereof; substantially as described.

5. Means for elevating wheels provided with pneumatic tires comprising two alining bases having hub-receiving beds and an adjustably-attached flexible connection between the two alining bases; substantially as described.

6. A device of the class described comprising a vertical frame provided with a flange, a resilient bed on said frame for receiving a vehicle-hub, and an adjustable part attached to said frame and coöperating with said flange for holding the resilient bed in position; substantially as described.

In testimony whereof I hereunto affix my signature, in the presence of two witnesses, this 24th day of May, 1905.

JOHN C. WANDS.

Witnesses:
B. F. FUNK,
GEORGE BAKEWELL.